United States Patent Office 2,934,544
Patented Apr. 26, 1960

2,934,544

POLYNUCLEAR QUINONES

Harry Norman Cripps, Hockessin, Del., assignor to E. I. du Pont de Nemours and Company, Wilmington, Del., a corporation of Delaware No Drawing. Application January 17, 1958
Serial No. 709,443

6 Claims. (Cl. 260—365)

This invention relates to cyclic ketones and more particularly to polycyclic diketones.

Cyclic diketones are well-known chemical compounds that are useful for a variety of purposes. Some of these are particularly useful for conversion to quinones which are in turn useful as dyes. The particular color and shade of the dye obtained from such a quinone depends in large part on the particular substituents and nuclear structure of the quinone. It is, therefore, desirable to provide new cyclic diketones and quinones that have different structures capable of providing valuable dyes, and for providing quinones that are useful as photo-initiators.

A novel type of polycyclic diketone is now provided by this invention. These are polycyclic compounds having a four-membered carbocyclic ring fused to a six-membered carbocyclic ring, which is in turn fused to another six-membered carbocyclic ring containing two doubly bonded oxygen atoms joined to the two annular carbons adjacent to the two carbon atoms common to both six-membered rings.

The preferred polynuclear diketones of this invention have the formulas

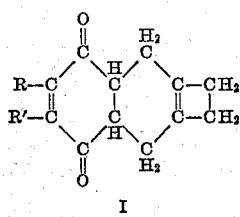

I and

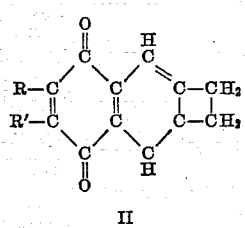

II wherein R and R' represent hydrogen, alkyl, aryl, halogen (i.e., fluorine, chlorine, bromine, and iodine), and when taken together represent a fused aromatic hydrocarbon ring. An especially preferred group of the polynuclear diketones of the above formulas comprises those wherein R and R' are the hydrocarbon groups specified above and which together have a total of no more than six carbon atoms.

The polynuclear diketones of Formula I are prepared by reacting 1,2-dimethylenecyclobutane,

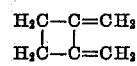

with a quinone of the formula

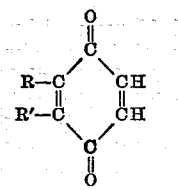

wherein R and R' have the significance recited above. The reaction takes place in a non-polar solvent having a boiling point below approximately 100° C., e.g., benzene or diethyl ether, in the presence of a polymerization inhibitor, e.g., phenothiazine or hydroquinone. Reaction temperatures may range from about 0° up to about 125° C. and are preferably between 25° and 100° C. The reaction is conveniently carried out at the reflux temperature of the reaction mixture.

The proportions of the 1,2-dimethylenecylobutane and the quinone are not critical; equal molecular quantities give satisfactory results although an excess of either reactant can be used if desired. The reaction is optionally carried out under an inert atmosphere, such as nitrogen, and at pressures which may be atmospheric, subatmospheric, or superatmospheric. The reaction time depends on the reactivity of the particular reactants and on the temperature being employed. Reaction times ranging from 2 hours to 24 hours or longer are ordinarily used.

After the reaction is completed, the solvent is removed by distillation and the resulting solid adduct of 1,2-dimethylenecyclobutane and the quinone can be purified by recrystallization.

The polynuclear quinones of Formula II are prepared by oxidation of the diketones of Formula I. This oxidation is conveniently carried out by passing air or oxygen through a solution of the polynuclear diketone of Formula I in a solvent capable of giving hydroxyl ions, e.g., mixtures of ethyl or methyl alcohol with water, in the presence of a base, e.g., sodium or potassium hydroxide. The reaction temperature is not critical as the oxidation takes place readily at room temperature. Air or oxygen is passed through until the greenish brown color of the solution disappears. When sufficient solvent is employed to dissolve the oxidation product completely reaction times ranging from a few minutes, e.g., thirty minutes, up to several hours, e.g., four hours, are sufficient. The solid quinone obtained on oxidation of the diketone is isolated by precipitation followed by recrystallization.

The 1,2-dimethylenecyclobutane can be prepared by the dimerization of allene, for example, by the method described by Blomquist and Verdol in J. Am. Chem. Soc. 78, 109 (1956). The quinones used in the process of this invention can be of the grades commercially available or they can be made by known methods.

The following examples in which the portions of ingredients are expressed in parts by weight unless otherwise specified illustrate the invention in greater detail.

Example I

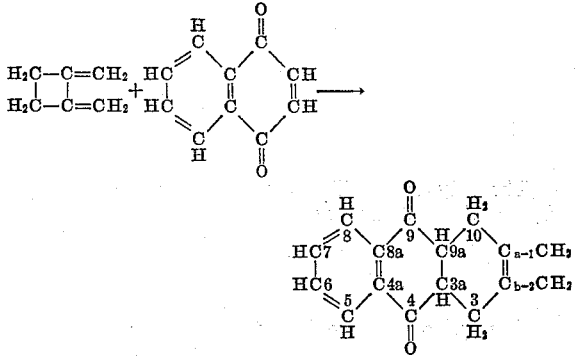

A mixture of 66 parts of benzene, 3.03 parts (0.038 mole) of 1,2-dimethylenecyclobutane (B.P. 73° C.), 6.2 parts (0.039 mole) of 1,4-naphthoquinone, and 0.05 part of phenothiazine is heated at reflux (about 80° C.) under a nitrogen atmosphere for 24 hours. The benzene is then removed by distillation under reduced pressure and the solid residue, amounting to 9.17 parts, is recrystallized from cyclohexane. There is obtained 6.0 parts of white needles of 1,2,3,3a,9a,10-hexahydrocyclobuta[b]anthracene-4,9-dione melting at 155.5–157° C.

Analysis.—Calc'd for $C_{16}H_{14}O_2$: C, 80.64%; H, 5.92%; M.W., 238.3. Found: C, 81.27%; H, 5.97%; M.W., 250, 254.

The infrared and ultraviolet absorption spectra exhibited by this diketone are consistent with the structure indicated above.

Example II

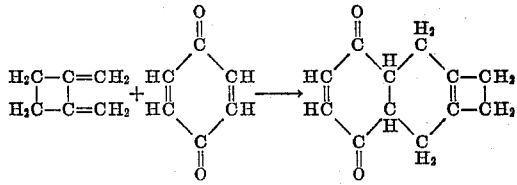

A solution of 11.0 parts of allene dimer (containing 85% of 1,2-dimethylenecyclobutane), 16.2 parts of benzoquinone and 0.025 part of phenothiazine in 66 parts of benzene is heated at reflux (about 80° C.) for 4 hours. The reaction mixture is then cooled whereupon part of the product (6.5 parts) crystallizes from the reaction mixture. An additional 10 parts of crude product is obtained after removal of the benzene solvent by evaporation. After recrystallization from cyclohexane, the 1,2,3,3a,7a,8-hexahydrocyclobuta[b]naphthalene-4,7-dione melts at 122–123° C.

Analysis.—Calc'd for $C_{12}H_{12}O_2$: C, 76.57%; H, 6.43%; M.W., 188. Found: C, 74.60%, 74.99%, 75.40%; H, 6.69%, 6.63%, 6.52%; M.W., 189, 194.

The infrared absorption spectrum exhibited by this product is compatible with the structure shown above.

Example III

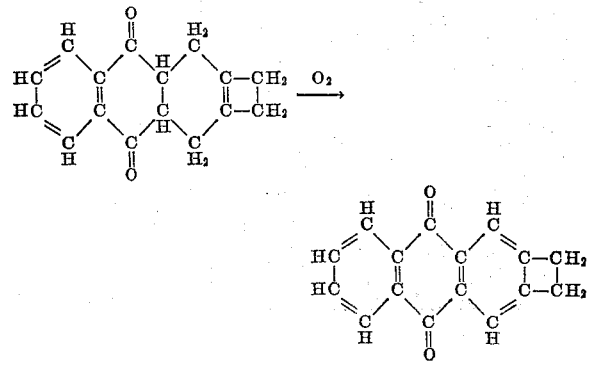

Air is bubbled through a mixture of 2 parts of a 10% aqueous sodium hydroxide solution, 8 parts of ethyl alcohol, 2 parts of distilled water and 0.2 part of 1,2,3,3a,9a,10 - hexahydrocyclobuta[b]anthracene-4,9-dione at room temperature until the greenish-black color disappears. 1,2-dihydrocyclobuta[b]anthracene-4,9-dione precipitates from the reaction mixture and there is obtained 0.18 part of this product. After recrystallization from ethyl acetate, this quinone melts at 252–257° C.

Analysis.—Calc'd for $C_{16}H_{10}O_2$: C, 82.04%; H, 4.30%; M.W., 234. Found: C, 81.47%, 81.29%; H, 4.86%, 4.90%; M.W., 232, 238.

The ultraviolet absorption spectrum of this quinone, dissolved in ethyl alcohol, shows the following absorption maxima:

| λ Max.–A. | ε |
|---|---|
| 2,590 | 34,100 |
| 2,650 | 30,900 |
| 2,770 | 10,200 |
| 3,270 | 3,760 |

The infrared spectrum shows characteristic absorption for the conjugated carbonyl at 6.0 microns, the aromatic double bonds at 6.25 microns and the saturated carbon-hydrogen bond at 3.45 microns.

The examples have illustrated this invention by reference to certain specific polynuclear diketones. However, when the specific quinones of Examples I and II are replaced by the following quinones and reacted with 1,2-dimethylenecyclobutane in the manner described in those examples, the following polynuclear diketones are obtained:

| Quinone Reactant | Polynuclear Diketone Product |
|---|---|
| 5-methyl-1,4-naphthoquinone | 5-methyl-1,2,3,3a,9a,10-hexahydrocyclobuta[b]anthracene-4,9-dione. |
| 5-hydroxy-1,4-naphthoquinone | 5-hydroxy-1,2,3,3a,9a,10-hexahydrocyclobuta[b]anthracene-4,9-dione. |
| 5-bromo-1,4-naphthoquinone | 5-bromo-1,2,3,3a,9a,10-hexahydrocyclobuta[b]anthracene-4,9-dione. |
| 5,8 (or 5,6)-dihydroxy-1,4-naphthoquinone. | 5,8 (or 5,6)-dihydroxy-1,2,3,3a,9a,10-hexahydrocyclobuta[b]anthracene-4,9-dione. |
| 6-hydroxy-1,4-naphthoquinone | 6-hydroxy-1,2,3,3a,9a,10-hexahydrocyclobuta[b]anthracene-4,9-dione. |
| 5,8-bismethylamino-1,4-naphthoquinone. | 5,8-bismethylamino-1,2,3,3a,9a,10-hexahydrocyclobuta[b]anthracene-4,9-dione. |
| 6-chloro-1,4-naphthoquinone | 6-chloro-1,2,3,3a,9a,10-hexahydrocyclobuta[b]anthracene-4,9-dione. |
| 5,6-dimethyl-1,4-naphthoquinone | 5,6-dimethyl-1,2,3,3a,9a,10-hexahydrocyclobuta[b]anthracene-4,9-dione. |
| 2-anilino-p-benzoquinone | 5-anilino-1,2,3,3a,7a,8-hexahydrocyclobuta[b]naphthalene-4,7-dione. |
| 2-chloro-p-benzoquinone | 5-chloro-1,2,3,3a,7a,8-hexahydrocyclobuta[b]naphthalene-4,7-dione. |
| 2-iodo-p-benzoquinone | 5-iodo-1,2,3,3a,7a,8-hexahydrocyclobuta[b]naphthalene-4,7-dione. |
| 2-methoxy-p-benzoquinone | 5-methoxy-1,2,3,3a,7a,8-hexahydrocyclobuta[b]naphthalene-4,7-dione. |
| 2-phenyl-p-benzoquinone | 5-phenyl-1,2,3,3a,7a,8-hexahydrocyclobuta[b]naphthalene-4,7-dione. |
| 2-methyl-p-benzoquinone | 5-methyl-1,2,3,3a,7a,8-hexahydrocyclobuta[b]naphthalene-4,7-dione. |
| 2,3-dimethyl-p-benzoquinone | 5,6-dimethyl-1,2,3,3a,7a,8-hexahydrocyclobuta[b]naphthalene-4,7-dione. |
| 2-methoxy-3-methyl-p-benzoquinone. | 5-methoxy-6-methyl-1,2,3,3a,7a,8-hexahydrocyclobuta[b]naphthalene-4,7-dione. |
| 2-chloro-3-methyl-p-benzoquinone | 5-chloro-6-methyl-1,2,3,3a,7a,8-hexahydrocyclobuta[b]naphthalene-4,7-dione. |

When the polynuclear diketones of the preceding table are oxidized by air or oxygen by the method of Example III, the following polynuclear quinones are obtained:

5-methyl-1,2-dihydrocyclobuta[b]anthracene-4,9-dione
5-hydroxy-1,2-dihydrocyclobuta[b]anthracene-4,9-dione
5-bromo-1,2-dihydrocyclobuta[b]anthracene-4,9-dione 5,8 (or 5,6)-dihydroxy-1,2-dihydrocyclobuta[b]anthracene-4,9-dione
6-hydroxy-1,2-dihydrocyclobuta[b]anthracene-4,9-dione
5,8 - bismethylamino-1,2-dihydrocyclobuta[b]anthracene-4,9-dione
6-chloro-1,2-dihydrocyclobuta[b]anthracene-4,9-dione
5,6 - dimethyl-1,2-dihydrocyclobuta[b]anthracene-4,9-dione
5-anilino-1,2-dihydrocyclobuta[b]naphthalene-4,7-dione
5-chloro-1,2-dihydrocyclobuta[b]naphthalene-4,7-dione
5-iodo-1,2-dihydrocyclobuta[b]naphthalene-4,7-dione
5-methoxy-1,2-dihydrocyclobuta[b]naphthalene-4,7-dione
5-phenyl-1,2-dihydrocyclobuta[b]naphthalene-4,7-dione
5-methyl-1,2-dihydrocyclobuta[b]naphthalene-4,7-dione
5,6 - dimethyl-1,2-dihydrocyclobuta[b]naphthalene-4,7-dione
5 - methoxy - 6-methyl-1,2-dihydrocyclobuta[b]naphthalene-4,7-dione
5 - chloro-6-methyl-1,2-dihydrocyclobuta[b]naphthalene-4,7-dione The polynuclear diketones of this invention of Formula II are particularly useful for condensation with dienophiles such as maleic anhydride at elevated temperatures to form polynuclear acid anhydrides or dicarboxylic acids. The resulting dibasic acids or anhydrides can be condensed with complementary bifunctional reactants, e.g., ethylene glycol or hexamethylenediamine, to form condensation polymers useful as coating compositions and the like. More particularly, a solution of the 1,2-dihydrocyclobuta-[b]anthracene-4,9-dione of Example III and maleic anhydride in tetramethylenesulfone heated for 4.25 hours at 200° C. in a nitrogen atmosphere gives 1,2,3,4,6,11-hexahydro-6,11-dioxonaphthacene - 2,3 - dicarboxylic anhydride.

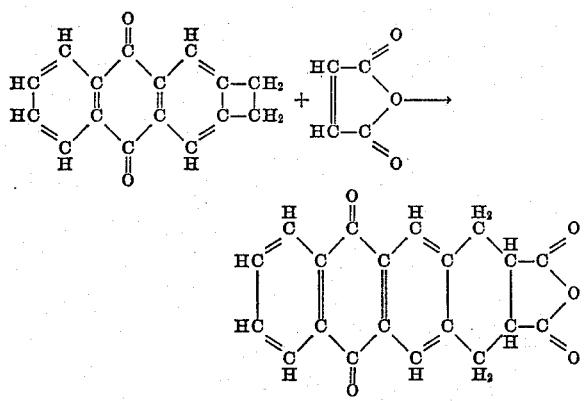

This product, which melts at 335–338° C. (decomposition) shows characteristic infrared absorption bands at 3.25 microns for aromatic carbon-hydrogen bonds, 3.4 microns for saturated carbon-hydrogen bonds, 5.4 and 5.6 microns for carboxylic anhydride group, 5.95 microns for conjugated carbonyl group, and 6.5 and 6.75 microns for aromatic double bonds. The dicarboxylic acid can be prepared from this dicarboxylic anhydride by dissolving a sample of the anhydride in a mixture of 3 parts of 5% aqueous sodium hydroxide, 10 parts of dioxane, and 5 parts of distilled water, filtering the resulting solution, and acidifying the filtrate with hydrochloric acid. The 1,2,3,4,6,11-hexahydro - 6,11 - dioxonaphthacene-2,3-dicarboxylic acid is isolated as a monohydrate.

The polycyclic diketones of Formula I are also useful for condensation with dienophiles such as 1,4-naphthoquinone at elevated temperatures to form polynuclear tetraketones. For example, a solution of 1,2,3,3a,9a,10-hexahydrocyclobuta[b]anthracene-4,9-dione of Example I and 1,4-naphthoquinone in xylene heated at reflux temperature for about 24 hours forms octahydrohexacene-5,8,13,16-tetrone.

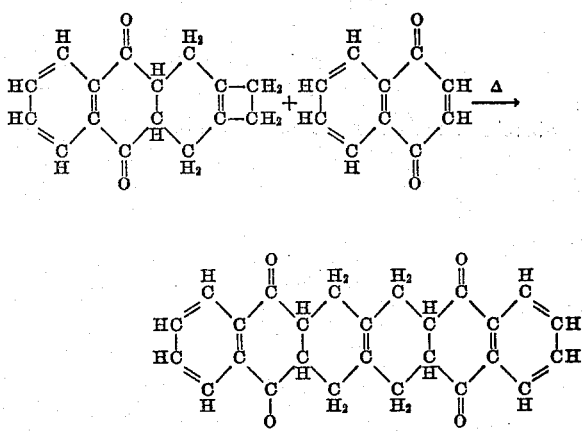

The polynuclear quinones of this invention of Formula II are particular utility as dyes. For example, 0.1 g. of the 1,2-dihydrocyclobuta [b] anthracene-4,9-dione of Example III is heated with a solution of 0.1 g. of sodium hydroxide and 0.5 g. of sodium hydrosulfite in 100 cc. of distilled water. The soluble red leuco form of the quinone readily forms. A small swatch of cotton cheesecloth is added and steeped in the bath for 10 minutes. When exposed to the air or washed in a 5% hydrogen peroxide bath, the yellow color is regenerated and the cloth is dyed a pale yellow. Nylon cloth can be substituted for the cotton. The polynuclear quinones of Formula II are also useful as photoinitiators in certain polymerization systems. For example, about 0.02 g. of the 1,2-dihydrocyclobuta[b]anthracene-4,9-dione of Example III is added to about 5 cc. of triethyleneglycol diacrylate containing about 50 parts per million of inhibitor (hydroquinone) is a cylindrical borosilicate glass vessel. The vessel is swept with nitrogen and closed from the atmosphere. The vessel is then exposed to the radiation from a 275-watt mercury arc sunlamp at a distance of 8 inches. Polymerization to a hard gel is complete within 30 seconds. In the absence of the anthraquinone of Example III under otherwise identical conditions, no polymerization is observed after 15 minutes.

I claim:
1. Polycyclic diketones having a four-membered carbocyclic ring fused to a six-membered carbocyclic ring which is in turn fused to another six-membered carbocyclic ring containing a doubly-bonded oxygen atom joined to each of the two annular carbons adjacent to the carbon atoms common to both six-membered rings.
2. A compound corresponding to the formula

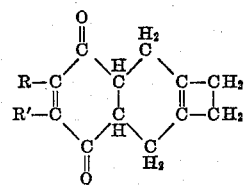

wherein R and R' represent a member from the group consisting of hydrogen, alkyl, aryl, and halogen, and when taken together represent a fused aromatic hydrocarbon ring.

3. A compound corresponding to the formula
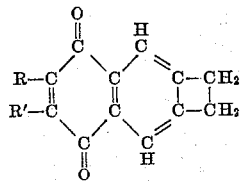
wherein R and R' represent a member from the group consisting of hydrogen, alkyl, aryl, and halogen, and when taken together represent a fused aromatic hydrocarbon ring.
4. 1,2,3,3a,9a,10 - hexahydrocyclobuta[b]anthracene-4,9-dione.
5. 1,2,3,3a,7a,8 - hexahydrocyclobuta[b]naphthalene-4,7-dione.
6. 1,2-dihydrocyclobuta[b]anthracene-4,9-dione.
No references cited.

UNITED STATES PATENT OFFICE
CERTIFICATE OF CORRECTION

Patent No. 2,934,544            April 26, 1960

Harry Norman Cripps

It is hereby certified that error appears in the printed specification of the above numbered patent requiring correction and that the said Letters Patent should read as corrected below.

Column 1, lines 48 to 55, Formula II should appear as shown below instead of as in the patent:

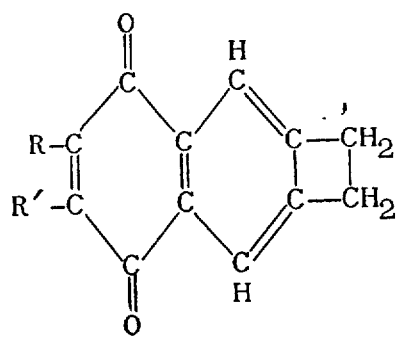

column 2, line 26, for "-dimethylenecylobutane" read -- -dimethylenecyclobutane --; column 3, lines 10 to 16, the right-hand portion of the formula in Example I should appear as shown below instead of as in the patent:

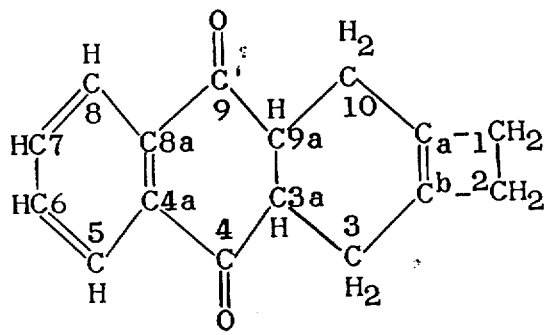

same column 3, line 56, for "6.69%" read -- 6.60% --; column 5, line 1, for "-dihydrocyclobutal[b]anthra-" read -- -dihydrocyclobuta[b]anthra- --; column 6, line 26, before "particular" insert -- of --; line 43, for "is a" read -- in a --.

Signed and sealed this 25th day of October 1960.

(SEAL)
Attest:

KARL H. AXLINE
Attesting Officer

ROBERT C. WATSON
Commissioner of Patents